United States Patent [19]

Van der Lely

[11] Patent Number: 4,778,013
[45] Date of Patent: Oct. 18, 1988

[54] PLOW WITH ADJUSTABLE MOLDBOARD

[76] Inventor: Cornelis Van der Lely, 7 Brüschenrain, Zug, Switzerland

[21] Appl. No.: 124,445

[22] Filed: Nov. 23, 1987

Related U.S. Application Data

[63] Continuation of Ser. No. 751,498, Jul. 3, 1985, abandoned.

[30] Foreign Application Priority Data

Jul. 3, 1984 [NL] Netherlands .................... 8402106

[51] Int. Cl.[4] .............................................. A01B 15/06
[52] U.S. Cl. .................... 172/225; 172/647; 172/716
[58] Field of Search ............... 172/224, 225, 226, 227, 172/260.5, 283, 714, 715, 716, 647, 736, 218, 221, 709

[56] References Cited

U.S. PATENT DOCUMENTS

| | | | |
|---|---|---|---|
| 255,898 | 4/1882 | Taylor | 172/742 |
| 260,482 | 7/1882 | Jefferson | 172/736 X |
| 295,069 | 3/1884 | Steudel | 172/736 |
| 340,360 | 4/1886 | Reuss | 172/736 X |
| 1,740,519 | 12/1929 | Miller | 172/159 |
| 2,326,097 | 8/1943 | Horner et al. | 172/647 |
| 2,772,619 | 12/1956 | Benefiel et al. | 172/141 |
| 3,162,247 | 12/1964 | Miller | 172/239 |
| 3,595,319 | 7/1971 | Adams | 172/7 |
| 3,749,178 | 7/1973 | Watts | 172/225 |
| 4,036,305 | 7/1977 | Kinzenbaw | 172/647 |
| 4,062,410 | 12/1977 | Moe | 172/260.5 X |
| 4,141,419 | 2/1979 | Buchele et al. | 172/647 X |
| 4,186,806 | 2/1980 | Ward | 172/647 X |
| 4,319,645 | 3/1982 | Totten | 172/736 X |
| 4,415,040 | 11/1983 | Salva | 172/225 |
| 4,577,698 | 3/1986 | Watts | 172/225 |

FOREIGN PATENT DOCUMENTS

| | | | |
|---|---|---|---|
| 196729 | 10/1986 | European Pat. Off. | 172/224 |
| 20088 | 5/1882 | Fed. Rep. of Germany . | |
| 96751 | 3/1897 | Fed. Rep. of Germany . | |
| 1301925 | 8/1969 | Fed. Rep. of Germany . | |
| 3218631 | 11/1983 | Fed. Rep. of Germany . | |
| 2030359 | 11/1970 | France . | |
| 2478423 | 9/1981 | France | 172/225 |
| 2517505 | 6/1983 | France . | |
| 10540 | of 1901 | United Kingdom | 172/218 |

Primary Examiner—Richard J. Johnson
Attorney, Agent, or Firm—Penrose Lucas Albright; Robert A. Miller

[57] ABSTRACT

A frame beam supports a plurality of plow bodies, the front plow body of which has a one-piece moldboard and is pivotable about an upwardly extending axis. Part of the moldboards of each of the following plow bodies is pivotable about an upwardly extending axis relative to the remainder of each such moldboard. Adjustment is made through rod systems from a common rod which is displaceable mechanically by a screwthreaded spindle or hydraulically by a piston and cylinder assembly. The latter adjustment is effected automatically in response to the tractive force required to drive the plow through the soil.

12 Claims, 4 Drawing Sheets

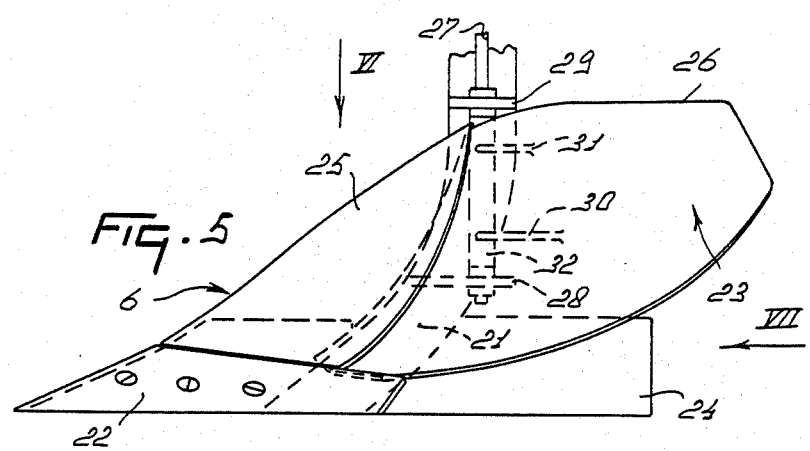
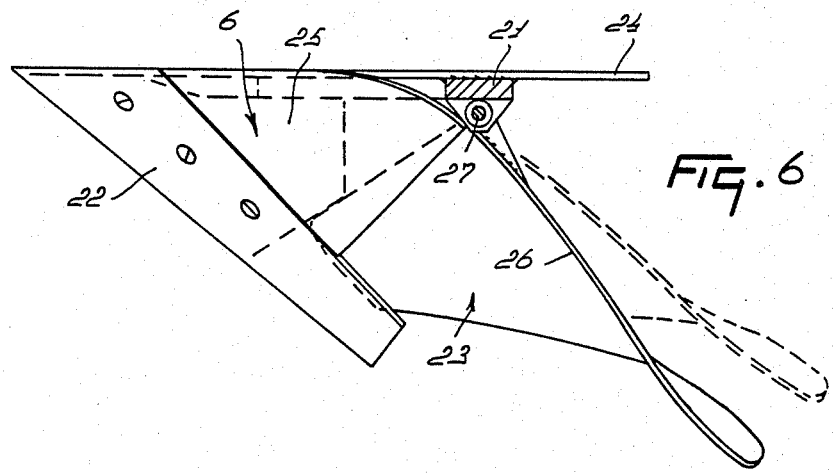
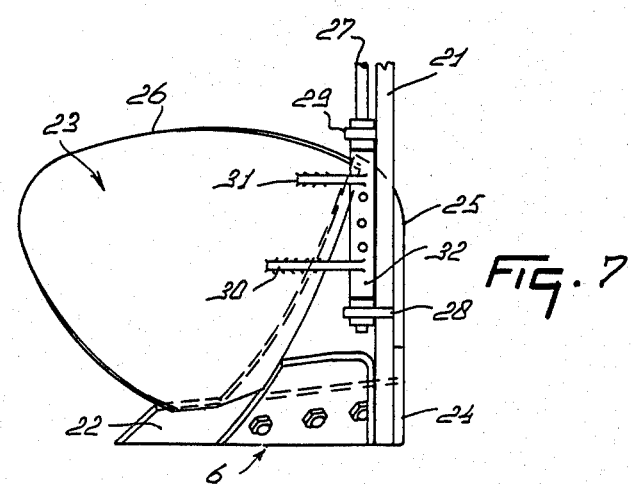

PLOW WITH ADJUSTABLE MOLDBOARD

This is a continuation of application Ser. No. 751,498 filed July 3, 1985, now abandoned.

This invention relates to a plow system comprising a frame and at least one plow body having means for adjusting to the soil being turned by the plow.

BACKGROUND OF THE INVENTION

Different plow bodies have been developed for different soil types and particular average tractor speeds, the differences in the plow bodies generally consisting of different ways of mounting the moldboard.

For sandy soils, cylindrical moldboards are used whereas for heavier clay soils, helical moldboards have been developed. Thus, if a farm has more than one soil type, the farmer is forced to buy more than one plow system if he is to work the soil to the best effect.

SUMMARY OF THE INVENTION

According to a first aspect of the present invention, means is provided for adjusting the orientation of at least two plow bodies with respect to the intended direction of operative travel of the plow system.

Using a construction in accordance with the present invention, it is practicable to make do with a single gang plow system and still obtain optimal turning and breaking up of the ground of different soil types and at various speeds.

Further, using this construction, the position of the plow bodies may be modified with respect to the frame of the plow in such a way that the angle at which the moldboards of the plow bodies are set is changed. In this way, the setting of the moldboards of the plowbodies can be adjusted to adapt to any type of soil and to any circumstances encountered, while, in addition, certain types of soil can be worked at a higher speeds than previously possible.

According to a second aspect of the present invention, means is provided for adjusting the orientation of the plowbody with respect to the intended direction of operative travel of the plow system, from an external location (the tractor driver's seat) during operation. This makes it practicable, during operation, to change the setting of the moldboards of the plow bodies with respect to the plowframe to obtain the optimum adjustment.

According to a third aspect of the present invention, means is provided for adjusting the orientation of the moldboard, with respect to the intended direction of operative travel of the plow system, that is dependent upon the tractive power required to propel the plow system. In this manner, an automatic adjustment of the moldboard setting to prevailing soil types and conditions results.

According to a fourth aspect of the present invention, the moldboard of the plow body is adjustable about a substantially vertical axis.

According to a fifth aspect of the present invention, the moldboards and the shares are adjustable together about an upwardly-directed axis with respect to the frame.

According to a sixth aspect of the present invention, the moldboard is adjustable about an upwardly-directed axis by means of a rod system.

Finally, a rod system that is part of the adjusting mechanism for the plowbody can be mounted, at least in part, near a hinge axis about which, in the event of overloading, the plow body pivots upwardly out of harm's way. The rod system it located so that is does not obstruct the upward pivoting of the plowbody.

For a better understanding of the present invention and to illustrate how it may be carried into effect, reference will now be made, by way of example, to the accompanying drawings, in which:

BRIEF DESCRIPTION OF THE DRAWINGS

FIG. 5 is a side view, on an enlarged scale, of a plowbody equipped with an adjustable moldboard;

FIG. 6 is a view in the direction of the arrow VI in FIG. 5; and

FIG. 7 is a view in the direction of the arrow VII in FIG. 5.

DESCRIPTION OF THE PREFERRED EMBODIMENTS

Figure 1:
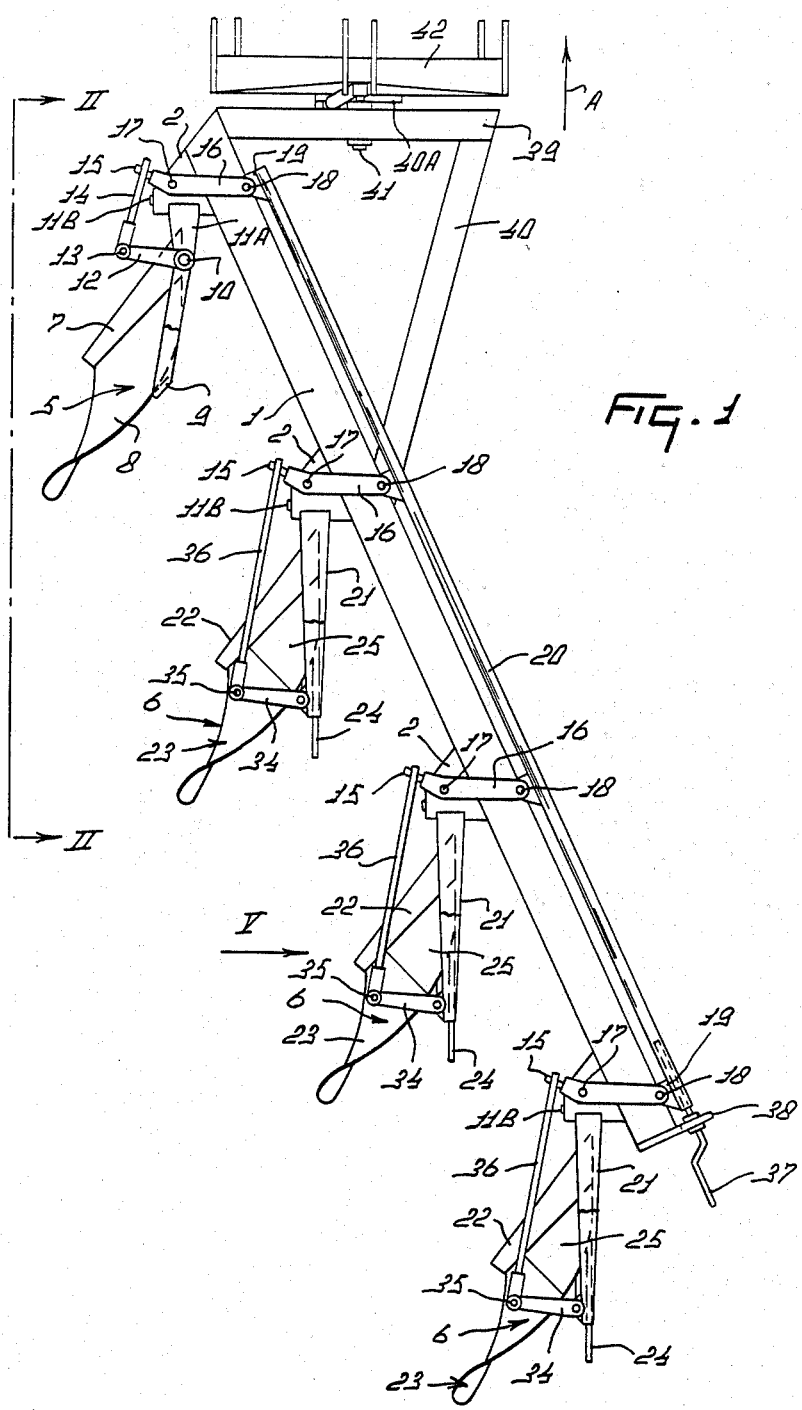
FIG. 1 is a plan view of the plow system according to the invention with the upper plowbodies removed for clarity.

The plow system shown in FIG. 1 is constructed as a reversible gang plow, and comprises a straight frame beam 1 which extends horizontally at an angle of approximately thirty degrees to the intended direction A of operative travel of the plow. Four regularly-spaced pairs of plowbodies 5 and 6 are disposed on one side of frame beam 1, and are secured to frame beam 1 by supports 2. Such supports 2 for each pair of plowbodies 5 and 6 are fixed to frame beam 1 near the ends of frame beam 1 and at positions between its ends. Each of plowbodies 5 of the front pair comprises a share 7 and a moldboard 8 attached to it; these two plowbodies 5 are connected to their support 2 by two divergent arms 9 which slope forwardly towards the frame beam 1. Each of arms 9 is practically straight and is fixed at its front end to a vertical or almost vertical hinge pin 10, which is held by sockets 11 secured to the rear of support 2 by a carrier 11A and a horizontal or almost horizontal transverse shaft or hinge pin 11B so that they can swivel with respect to the support 2. In addition there is an overload safety device, not illustrated, so that in the event of overloading during operation the plowbody can swivel backwards and upwardly out of harm's way.

Figure 2:
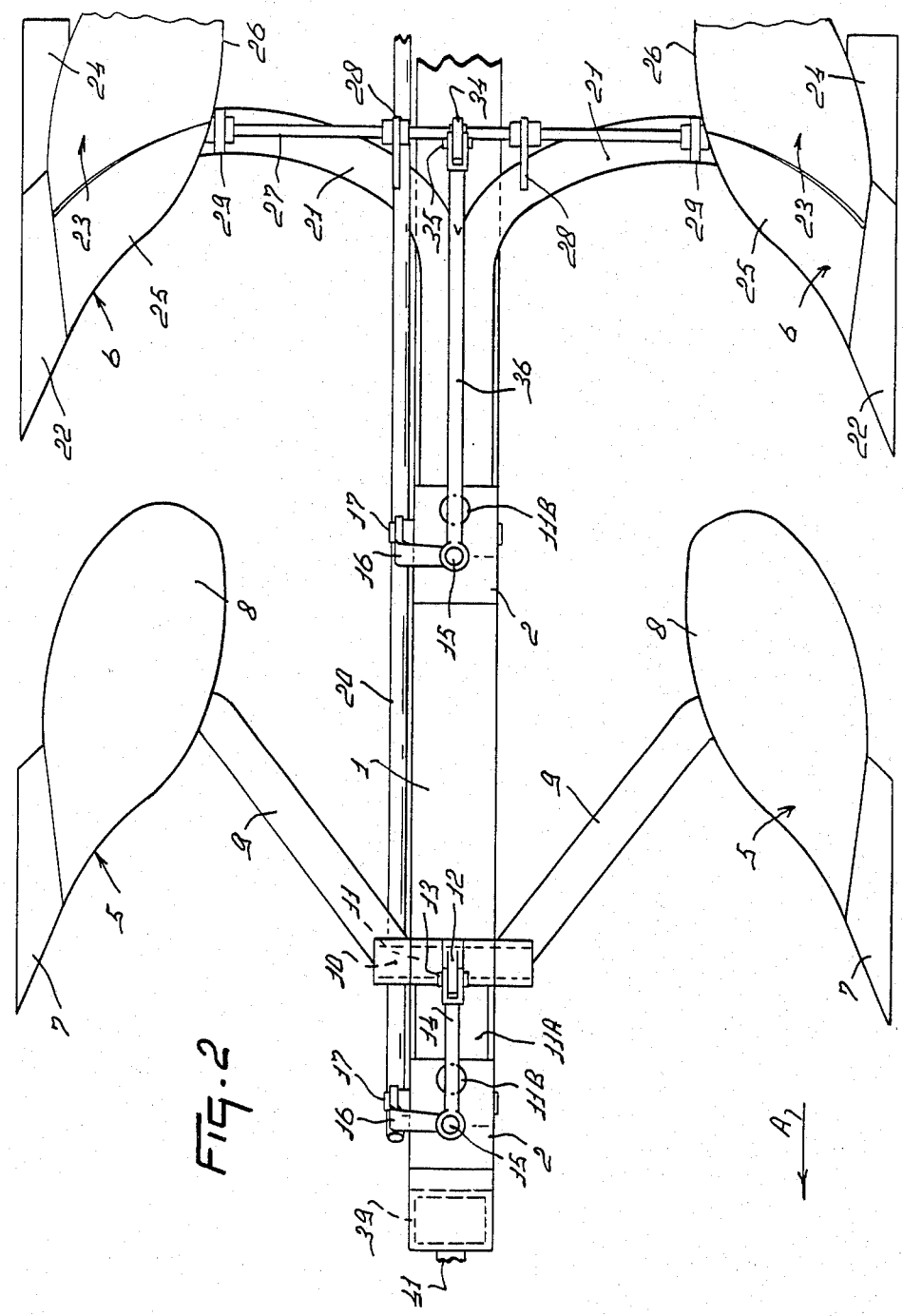
FIG. 2 is a broken view on a larger scale taken in the direction of the arrows II in FIG. 1.

As is plain from FIGS. 1 and 2, hinge pin 10 is situated at substantially the same position along frame beam 1 as the point of share 7. Between sockets 11, the hinge pin 10 is provided with an adjustment arm 12 which extends horizontally or almost horizontally away from beam 1 (FIG. 1). Adjustment arm 12 is pivotally connected by a pin 13 to a rod 14. Rod 14 is pivotally connected by a horizontal or almost horizontal transverse shaft 15 to one end of a lever 16, which is pivotable about a vertical or almost vertical pin 17 on top of the support 2. The other end of lever 16 is pivotable about a vertical or almost vertical pin 18 received in a socket 19 on a rod 20 which extends parallel to the frame beam 1. The rod 20, as seen from above, is on the opposite side of the beam 1 from the bodies 5 and 6.

The plowbodies of each pair of bodies 6 are each attached to a respective support 2 by means of arms 21 and hinge pin 11B, which in the same way as for bodies 5 is part of an overload safety device. Each of arms 21 extends forwardly from each body 6 in a smooth curve, horizontal or almost horizontal parts of arms 21 lying against each other (FIG. 2) and being connected to pin 11B and the rest of the overload safety device (not illustrated).

Each plowbody 6 comprises a share 22, a moldboard 23 joined to it and a beak colter or, as more aptly termed, a land side 24. The share 22 and the moldboard 23 correspond in shape and size to the share 7 and moldboard 8 of each of bodies 5. Moldboard 23 further comprises a front part 25 fixed to share 22 and extending at the botton somewhat further than two-thirds of the way along the share 22 (FIGS. 5 and 6). The rear part 26 of moldboard 23, which at the bottom extends over approximately one-third of the length of the top of share 22 has a portion which lies to the rear of front part 25 and so overlaps front part 25. Rear part 26 is pivotable with a hinge pin 27, which extends vertically or almost vertically and is freely pivotably-connected to arms 21 by lugs 28 and 29 so that there is a single hinge pin 27 for each pair of plowbodies 6 (FIG. 2).

Rear part 26 of moldboard 23 of each plow body 6 can pivot with hinge pin 27 with respect to front part 25 of moldboard 23, which is fixed to share 22. This pivoting, as seen in FIGS. 5-7, is achieved by means of strips 30 and 31 which extend horizontally or almost horizontally, the broader sides of which extend horizontally, and a sleeve 32, which is fixed to hinge pin 27. Hinge pin 27, as seen from above, is situated outside the moldboard (FIG. 6).

For swivelling, each hinge pin 27 for each pair of plowbodies 6 is fitted near the middle with an adjustment arm 34 which is horizontal or almost horizontal and extends transversely or almost transversely with respect to direction A. The end of the adjustment arm 34 away from the hinge pin 27 is pivotally connected to one end of a rod 36 by means of a vertical or almost vertical hinge pin 35. Rod 36 extends in direction A and is horizontal or almost horizontal. The other end of each rod 36 is connected to lever 16 by a horizontal or almost horizontal hinge pin 15. Lever 16 is mounted in the same way as the lever 16 of the plowbodies 5 and as such is pivotable about a vertical or almost vertical pin 18 received in a socket 19 on rod 20. Rod 20, which extends parallel to the beam 1 is selectively movable or adjustable lengthwise of the beam by means of a screwthreaded spindle 37 mounted at the rear. Screwthreaded spindle 37 can be slid into a slot in a lug 38 which is fixed to the rear end of the frame beam 1. By turning the spindle 37, the rod 20, is displaced lengthwise and it is thus possible, via the levers 16, rods 14 and 36 and arms 12 and 34, to change the orientation, with respect to direction A, of plowbodies 5 and of rear parts 26 of moldboards 23 of plowbodies 6. Thus, the plow can be attuned to the speed preferred for the plow system under the prevailing soil type or conditions. It is possible, independently of the type of soil to be worked, and without sacrificing an optimal turning of the soil, to maintain the most favorable speed by adjusting the setting or angle of front plowbody 5, and concurrently, the setting or angle of the rear part 26 of the moldboard 23 of the plowbodies 6, with respect to direction A.

Adjustment of plowbody 5, during which share 7 also pivots along with the moldboard 8, likewise produces an adjustment of moldboard 8 such that the soil can move over moldboard 8 in the best possible way for the speed selected. Because it alters the setting of share 7, adjustments of plowbody 5 also produce a change in the working width. Because plowbodies 6 are fitted so that only rear part 26 of moldboard 23 adjusts, plowbodies 6 can be used with beak colter 24 to obtain sufficient support against sideways reaction forces that must be absorbed in some manner. This is unnecessary, however, if most of the plowbodies are adjustable in the manner of plowbodies 5.

At the front of the frame beam 1, a cross member 39 is fixed by ends. A strut 40 is fixed to the opposite end of crossmember 39. Crossmember 39 is connected to a trestle 42 by a hinge pin 41 which extends in direction A. A reversing mechanism 40A, which may be of known construction, is provided for turning cross member 39 through 180 degrees relative to trestle 42, by which the plow may be coupled to the three-point lifting device of a tractor. This produces a reversible plow system with four pairs of plowbodies constructed and fitted as above.

Figures 3, 4:
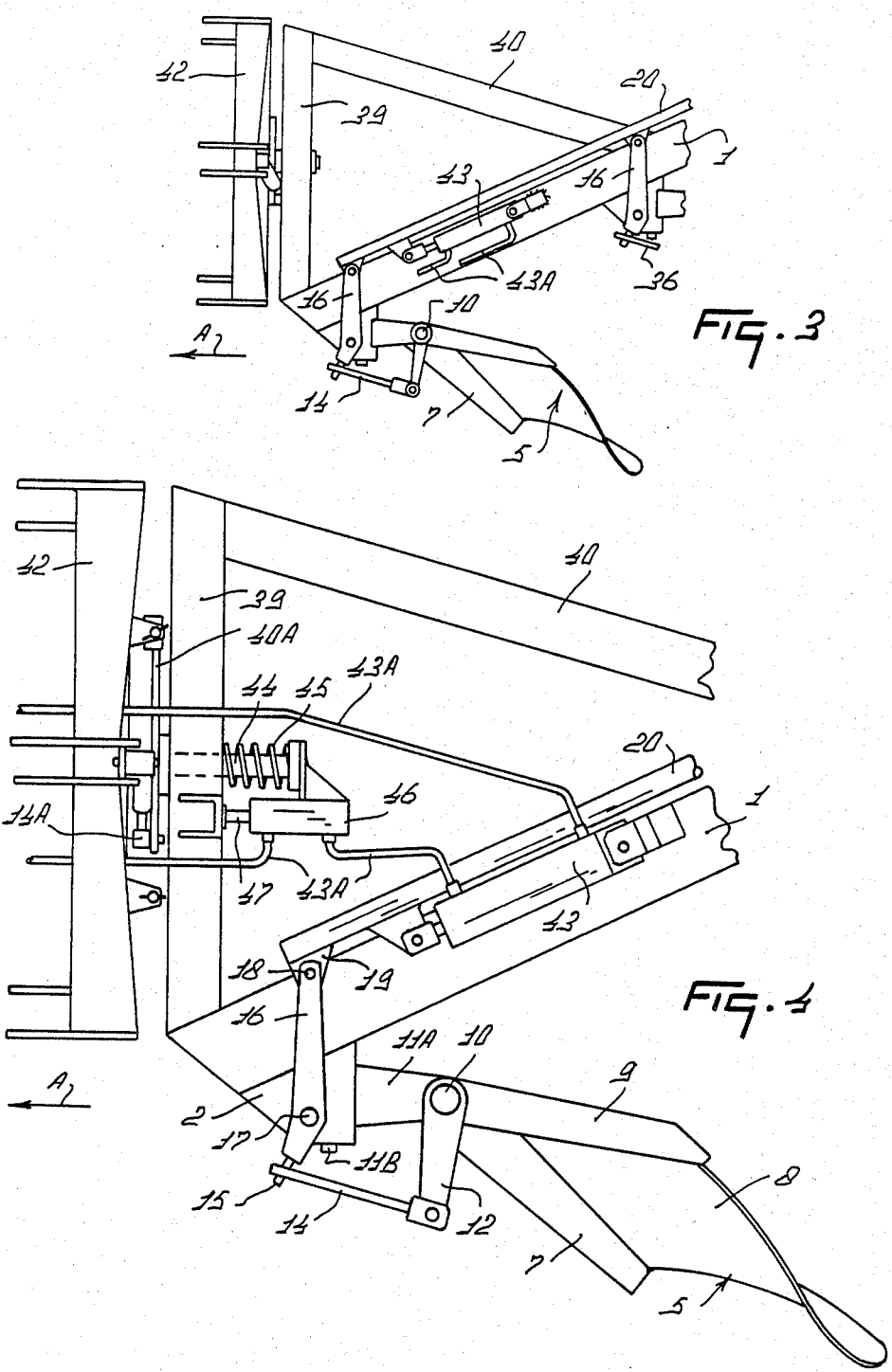
FIG. 3 is a view of part of the plow of FIG. 1 showing a modification comprising a manually-operated hydraulic cylinder for adjusting the plowbodies.
FIG. 4 corresponds to FIG. 3 but is on a larger scale and shows a further modification comprising a hydraulic adjusting cylinder for adjusting the plowbodies automatically.

Adjustment of rod 20 to adjust plowbodies 5 or the rear part 26 of moldboards 23 of plowbodies 6 can alternatively be effected by hydraulic means so that adaption to soil type and conditions is achieved from a tractor. This hydraulic adjustment is obtained by means of an adjustment piston and cylinder assembly 43 (FIG. 3), operated manually via the tractor's hydraulic system to which the assembly's cylinder 43 is connected by lines 43A. It is also possible for adjustment cylinder 43 to be operated by an automatic device designed to react to the load on the plow system. For this purpose hinge pin 41 is replaced by a shaft 44 (FIG. 4) along which cross member 39 can be moved in direction A with the action of a spring 45 surrounding part of the shaft. At the rear end of the shaft 44 there is a control valve 46 which is connected between the tractor's hydraulic system and adjustment piston and cylinder assembly 43. Operating member 47 of control valve 46 is connected to crossmember 39. If the plow system becomes more heavily loaded during forward motion at a particular speed, for example because the soil composition becomes heavier, or because weather conditions have made the soil more difficult to work, then frame beam 1, with the crossmember 39, moves backwards along the shaft against the action of the spring 45. The backward movement of the crossmember 39 actuates the operating arm 47 of control valve 46 which, in turn, actuates the adjustment piston and cylinder assembly 43, by means of the tractor's hydraulic system. The adjustment piston and cylinder assembly adjust rod 20 which extends along the frame beam 1 so that the moldboards of plow bodies 5 and 6 are collectively reset to a modified setting which is the optimum for the new conditions.

Using the means described above for the collective adjustment of the angle that plowbodies 5 and rear part 26 of moldboards 23 of plowbodies 6 make with direction A, it is possible, before starting plowing and selecting a particular tractor speed, to establish a particular angle setting for each moldboard, per se, so that, even if there are several different types of soil on the field to be worked, it is possible to work the entire area satisfactorily while maintaining a uniform speed. It is also possible, for example, to plow more rapidly by changing the moldboards' angle to a setting better suited to a selected higher tractor speed. Similarly, turning and pulverization of the soil, as a function of tractor speed, can be controlled more effectively than before and also the same plow system can be used at all times, irrespective of the condition of the soil.

Hydraulic adjustment, particularly automatic hydraulic adjustment, is well suited to the modern tractor because it is possible to adjust, or maintain adjustment, of the moldboards to their most favorable settings from the driver's cab.

Because shaft 11B of the overload safety device is located close to shafts 15 of the rod system for the adjustment of the moldboards, plowbodies 5 and 6 can swing backwards without difficulty. At the same time it is possible, if necessary, to introduce an extra degree of play in the hinge point enclosing each shaft 15. The rod system for adjusting the moldboards to prevailing conditions is so constructed that adjustment arms 12 and 34 are relatively short and rods 14 and 36 run more or less in direction A so that some of the reaction forces are directed along rods 14 and 36.

Although various features of the plow described and illustrated in the drawings, are set forth in the following claims as inventive features, the invention is not necessarily limited to these features and may encompass any and all novel and inventive features, considered both individually and in various combinations.

I claim:

1. A plow system, comprising:
   a pivotal frame which is provided with means for being coupled to a tractor's three point lifting device;
   a main frame beam that extends obliquely rearwardly with respect to the plow system's operative direction of travel;
   a plurality of paired plowbodies mounted equidistantly apart along said main frame beam, each plowbody of a front pair of said paired plowbodies having a share and an adjustable moldboard and each plowbody of subsequent pairs of said paired plowbodies having a share, a land side, a fixed moldboard part and an adjustable moldboard;
   a support arm connecting each said plowbody to a support attached to said main frame beam;
   a hinge pin for each said pair of plowbodies attached at each end to a said adjustable moldboard of said plowbody of said paired plowbodies, said hinge pin connected at its center part to adjustment means comprising an adjustment arm and a movable rod, each said adjustment arm being essentially horizontal and extending essentially transversely with respect to said operative direction of travel and said movable rod being essentially horizontal and extending essentially parallel to said operative direction of travel;
   a transverse shaft connected at one end to said movable rod and at an opposite end to a lever, said lever pivotable about an essentially vertical pin and having its opposite end attached to an adjustment rod lying essentially parallel to and along the length of said main frame beam;
   whereby said adjustable moldboards may be adjusted to accommodate different types and conditions of soil.

2. A plow system in accordance with claim 1 wherein said hinge pin is disposed near the rear side of its corresponding said adjustable moldboard with respect to the intended direction of the plow system's operative direction of travel as viewed in side elevation.

3. A plow system in accordance with claim 1 wherein said subsequent pairs of paired plow bodies moldboard has a fixed moldboard part and an adjustable moldboard, said major part being said adjustable moldboard.

4. A plow system in accordance with claim 3 wherein said fixed moldboard part extends approximately two-thirds of the length of said share for the corresponding plowbody.

5. A plow system in accordance with claim 1 wherein said movable rod is movable lengthwise in directions parallel to said main frame beam.

6. A plow system in accordance with claim 5 wherein a screwthreaded spindle is connected to the rear end of said main frame beam, said spindle adapted to effect the selective movement of said adjustment rod.

7. A plow system in accordance with claim 3 comprising an adjustment cylinder for selectively moving said adjustment rod.

8. A plow system in accordance with claim 7 comprising control means and a hydraulic system in the tractor for the plow system wherein said adjustment cylinder is operable manually through said control means from the driver's seat of the tractor to which the plow system is hitched and is actuale from said hydraulic system of the tractor.

9. A plow system as claimed in claim 7 comprising a control valve for said adjustment cylinder wherein said adjustment cylinder is operable by said control valve, said control valve being so constructed and arranged to be responsive to tractive forces exerted by the plow system.

10. A plow system in accordance with claim 9 wherein said control valve is affixed to a cross member connected to said frame at a position in front of said plow bodies, said cross member being movable rearwardly relative to a trestle included in said frame for coupling to a three-point lifting device of a tractor in an arrangement so that such rearward movement actuates said control valve.

11. A plow system as claimed in claim 1 wherein said pivotal frame comprises:
    a cross member fitted at an end of said main frame beam closest to said tractor's three point lifting device;
    a trestle to which said cross member is pivotally connected by means of a hinge pin which extends in said operative direction of travel;
    a reversing means for pivoting said cross member through 180 degrees relative to said trestle thereby reversing the direction of said oblique rearward extension of said main frame beam and engaging second plowbodies of said paired plowbodies with the ground.

12. A plow system, comprising:
    a frame which is provided with means for being coupled to a tractor's three-point lifting device;
    a main frame beam that extends obliquely rearwardly with respect to the direction of the plow system's travel, a plurality of paired plowbodies mounted equidistantly apart along said main frame beam, each said plowbody of said plowbodies having a share and a moldboard, a major part of each said moldboard being pivotable with respect to the remainder of said moldboard about a substantially vertical axis afforded by a substantially vertical hinge pin disposed near the rear side of its corresponding said moldboard with respect to the plow system's operative direction of travel;

said hinge pin being connected to an adjustment means, said adjustment means including an adjustment arm and a forward extending rod;

said major part of each said moldboard overlapping said remainder of said moldboard, said hinge pin attached to each said moldboard being connected to a said adjustment arm for each said moldboard, each said adjustment arm being disposed above said plowbody and connected by means of a forward extending rod to a lever for each said moldboard;

said lever being pivotally connected to an adjustment rod that extends substantially parallel to said main frame beam and is adapted collectively to adjust the relative dispositions of said moldboard parts for different types and conditions of soil.

* * * * *